United States Patent [19]

Clyde

[11] 4,420,462
[45] Dec. 13, 1983

[54] CATALYTIC HEAT EXCHANGER

[76] Inventor: Robert A. Clyde, P.O. Box 983, Asheville, N.C. 28802

[21] Appl. No.: 360,605

[22] Filed: Mar. 22, 1982

[51] Int. Cl.$^3$ .............................................. F28D 7/06
[52] U.S. Cl. ................................ 422/201; 48/196 A; 165/176; 422/190; 422/193; 422/198; 422/228
[58] Field of Search ................ 422/198, 205, 200–202, 422/228, 211, 190, 193; 48/196 A; 252/455 R; 165/104.19, 166, 176

[56] References Cited

U.S. PATENT DOCUMENTS

| 2,209,040 | 7/1940 | Simpson et al. | 422/201 X |
| 2,391,315 | 12/1945 | Hulsberg | 422/200 X |
| 3,914,111 | 10/1975 | Anderson | 422/200 |
| 4,110,256 | 8/1978 | Takeuchi et al. | 252/455 R X |
| 4,162,290 | 7/1979 | Crawford et al. | 48/196 A X |
| 4,222,434 | 9/1980 | Clyde | 165/166 X |
| 4,230,669 | 10/1980 | Eagle et al. | 422/198 X |
| 4,246,235 | 1/1981 | Rogers | 422/211 X |
| 4,256,783 | 3/1981 | Takada et al. | 422/202 X |

Primary Examiner—Richard L. Chiesa
Attorney, Agent, or Firm—D. I. Hague

[57] ABSTRACT

A catalytic heat exchanger useful for carrying out a catalytic reaction wherein a gaseous or vaporized mixture is flowed into contact with a catalytic material reactive with such mixture. The heat exchanger includes a reaction zone divided by a plurality of baffle plates into regions of progressive increasing or decreasing volume. The baffle plates form a tortuous flow path for the gaseous or vaporized mixture that provides intermittent contact with a bundle of heat exchange tubes and the catalytic material. The intermittent contact in turn provides a uniform reaction temperature which promotes reaction specificity.

13 Claims, 4 Drawing Figures

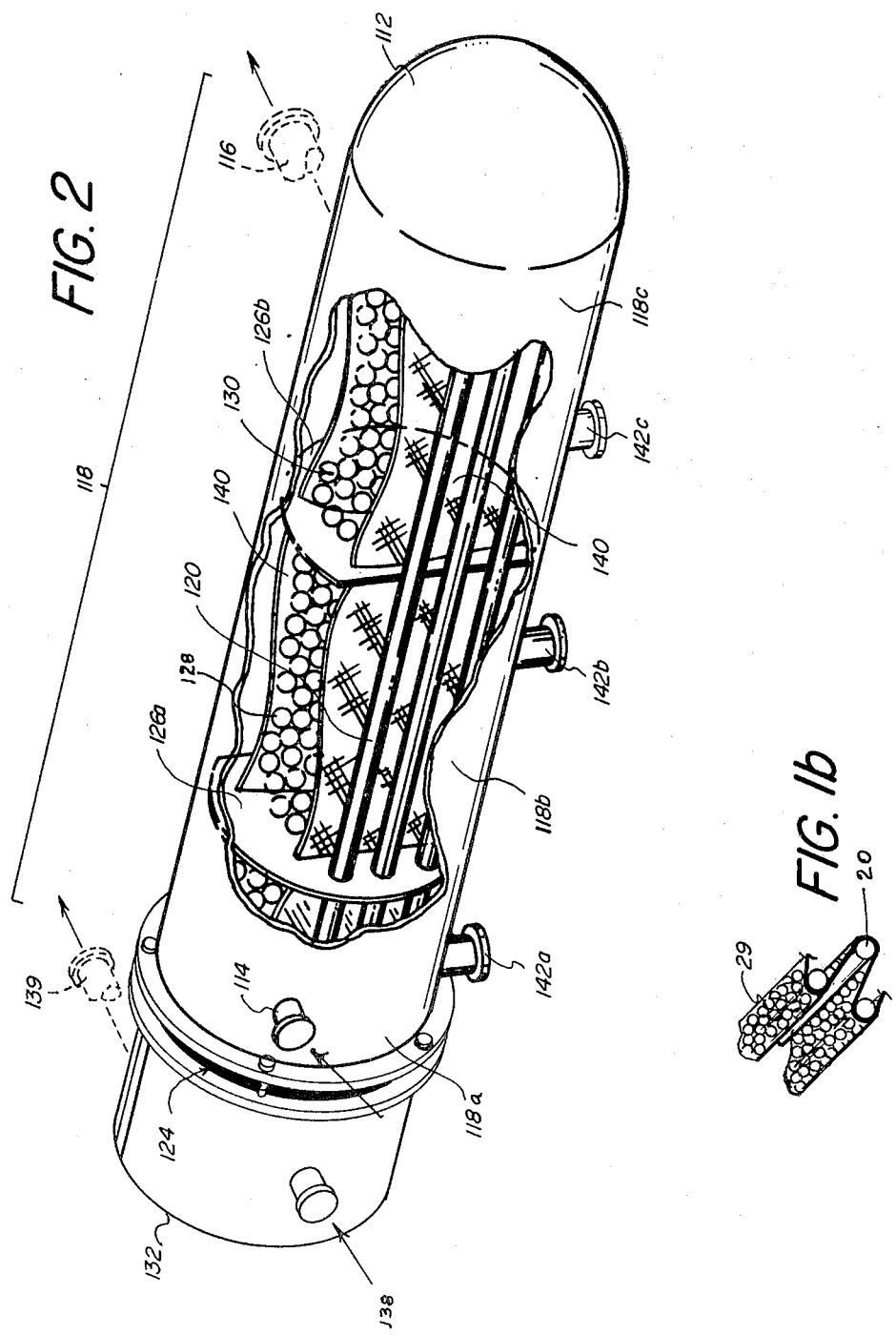

CATALYTIC HEAT EXCHANGER

BACKGROUND OF THE INVENTION

1. Field of the Invention

The present invention relates to a catalytic heat exchanger and to a method of carrying out a catalytic reaction wherein gaseous or vaporized reactants are flowed into contact with a catalytic material.

2. Description Relative to the Prior Art

The catalytic heat exchangers disclosed in U.S. Pat. Nos. 4,162,290, and 4,256,783 comprise a reaction chamber having input and output ports through which a heat exchange fluid is introduced and withdrawn. A plurality of tubes disposed within the reaction chamber and adapted to circulate gaseous or vaporized reactants therethrough contain a catalytic material inside of the tube walls. As the heat exchange liquid is pumped through the reaction chamber and contacts the outside of the tubes, the desired catalytic reaction takes place within the tubes.

There are a number of disadvantages to the aforementioned prior art catalytic heat exchangers. First, in many cases when gaseous or vaporized reactants are put through a catalytic reaction, there is an increase or decrease in gas or vapor volume. For example, when methanol is decomposed to hydrogen and carbon monoxide ($CH_3OH + heat \rightarrow 2H_2 + CO$) 2 mols of hydrogen and 1 mol of carbon monoxide are produced from one mol of methanol. However, no provision is made in these prior art exchangers for expansion or contraction of the gases. Second, in the prior art exchangers, the tubes are made of stainless steel and the catalyst is coated on ceramic pellets located inside the tubes. When heated, the stainless steel tubes expand more rapidly than the ceramic pellets, causing the pellets to become loose and abrade to dust, especially when subject to vibration as, for example, in an automobile catalytic converter system. Third, it is difficult to maintain a uniform temperature which promotes reaction specificity throughout the reaction chamber of these prior art exchangers. Fourth, replacement of the catalyst material in the prior art exchangers requires an expensive tube cleaning procedure. In some instances, where the tubes cannot be effectively cleaned, the tubes and tube support structure must be replaced.

U.S Pat. No. 4,246,235 discloses a horizontal flow catalytic reactor particularly useful as a catalytic recombiner for boiling water nuclear reactors. In this catalytic reactor, a foraminous retaining means adapted to be easily filled and emptied with particle-form catalytic material occupies the complete cross-section of the reaction zone available for the flow of the reactant gases. The principal disadvantage of this apparatus is that the reacting gases pass through the catalytic material only once. This requires a very high pressure for any useful volume of catalyst and temperature uniformity across the volume of catalyst is difficult to maintain.

SUMMARY OF THE INVENTION

The present invention provides an improved catalytic heat exchanger which is simple in design while providing for expansion (or contraction) of the reactants, a uniform reaction temperature and increased catalytic material life. This is accomplished in accordance with the present invention by a catalytic heat exchanger comprising a hollow container defining a reaction zone for a gaseous or vaporized mixture and a catalytic material reactive with such mixture. An inlet conduit and an outlet conduit for the gaseous or vaporized mixture are respectively located at the opposite ends of the reaction zone. Baffle plates disposed within the reaction zone transverse to the flow of the gaseous or vaporized mixture occupy substantial but incomplete cross-sections of the reaction zone available for the flow of the gaseous or vaporized mixture. The baffle plates form a tortuous flow path for the gaseous or vaporized mixture and divide the reaction zone into a plurality of regions each having a different transverse volume. Heat exchange tubes disposed within each of the regions of the reaction zone are adapted to circulate a heat exchange fluid therethrough in a manner such that the gaseous or vaporized mixture flowing through the reaction zone sequentially (1) flows across the heat exchange tubes, (2) flows through catalytic material located in a first region of the reaction zone, (3) flows around a baffle plate, (4) flows across the heat exchange tubes and (5) flows through catalytic material located in a second region of the reaction zone. This flow process is repeated until the gaseous or vaporized mixture flows through each of the regions of the reaction zone and is withdrawn through the outlet conduit.

The catalytic heat exchanger in accordance with the present invention provides a number of advantages. The intermittent contact of the gaseous or vaporized mixture with the heat exchange tubes within the reaction zone promotes a uniform reaction temperature which in turn provides reaction specificity. Proper location of the baffle plates (at progressively increasing or decreasing distances) provides for expansion or contraction of the reaction components. The catalytic material which can be provided in any one of several commercially available forms, i.e. parallel hole monolith, ceramic sponge, wire mesh, or ceramic pellets, is not subject to abrasion from expansion or contraction and therefore has a longer useful life. Furthermore, by disengaging the exchanger shell from a removable bonnet head, the heat exchange tubes can be easily removed for cleaning or replacement. The catalytic material can be easily inserted and removed from the reaction zone via the bonnet head and shell disengagement or, when provided in pellet form by means of one or more nozzles.

The invention and its features and advantages will become more apparent by referring to the accompanying drawings and to the ensuing detailed description of the preferred embodiments.

BRIEF DESCRIPTION OF THE DRAWINGS

FIG. 1B shows a wire mesh which is useful for retaining catalytic material within the reaction zone of the heat exchanger of FIG. 1; and FIG. 2 is a front perspective view, partially broken away, of another embodiment of a catalytic heat exchanger according to the present invention.

DETAILED DESCRIPTION OF THE PREFERRED EMBODIMENTS

Because catalytic heat exchangers are known in the art, the present description will be directed in particular to those elements forming part of or cooperating directly with, apparatus in accordance with the present invention. It is to be understood that elements not specifically shown or described may take various forms well known to those having skill in the heat exchanger art.

Figure 1A:
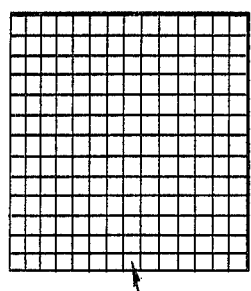
FIG. 1A shows a parallel hole monolith which is useful for retaining catalytic material within the reaction zone of the heat exchanger of FIG. 1.
Figure 1:
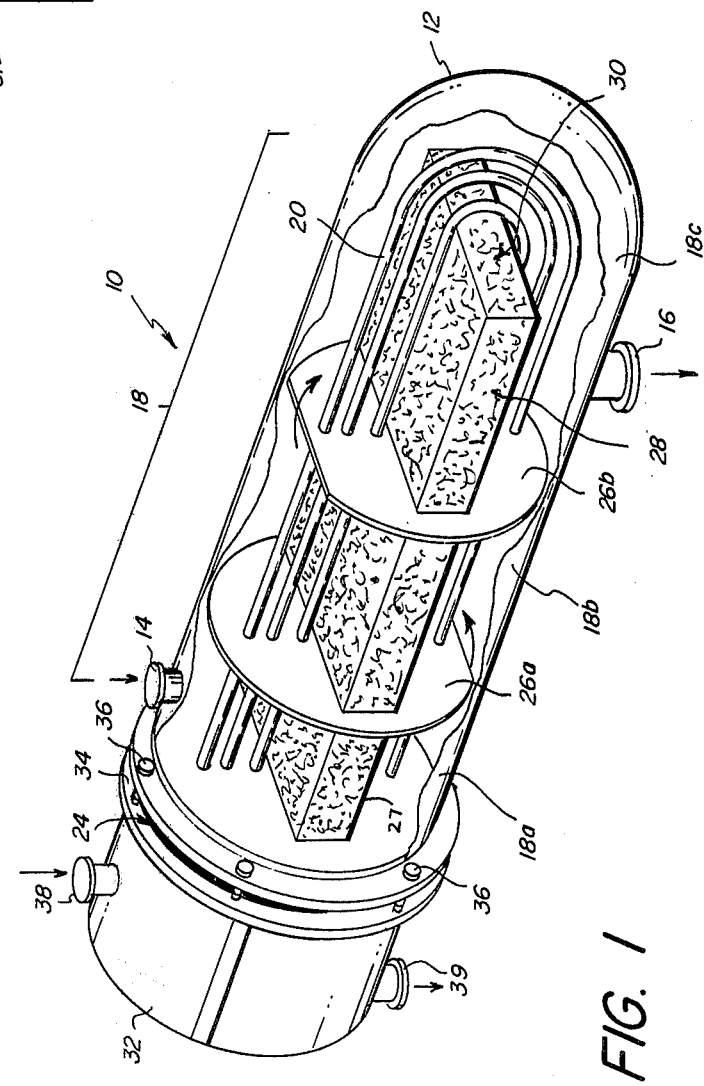
FIG. 1 is a front perspective view, partially broken away, of a catalytic heat exchanger constructed in accordance with the teachings of the present invention.

Referring now to the drawings, FIG. 1 shows a catalytic heat exchanger generally indicated by reference numeral 10. As illustrated in FIG. 1, the exchanger 10 comprises a hollow, open-ended, cylindrically shaped shell 12 having an inlet conduit 14 and an outlet conduit 16 for a gaseous or vaporized mixture which is to be reformed located at opposite ends of a reaction zone 18. Disposed within the reaction zone 18 are a plurality of U-shaped heat exchange tubes 20 and a supporting member 28 for a catalytic material 30 which is reactive with the gaseous or vaporized mixture. The heat exchange tubes 20 are supported by a stationary tube sheet 24 and a plurality of transverse baffle plates 26. The catalytic material supporting member 28 is supported by a shock absorbing cushion 27. The catalytic material supporting member 28, per se, forms no part of the present invention and maybe selected from those available in the art. The particular supporting member shown in FIG. 1 comprises a ceramic sponge made in accordance with the teachings of my U.S. Pat. No. 4,222,434, the disclosure of which is incorporated herein by reference. A ceramic sponge provides excellent mixing of the catalyst material with the gaseous or vaporized mixture but is relatively expensive to manufacture and causes a relatively high pressure drop. Another useful supporting member is a "honeycomb", parallel hole monolith 31, shown in FIG. 1A. Ceramic "honeycombs" are commercially available from Corning Glass Company in Corning, N.Y. or Applied Ceramics Company in Atlanta, Ga. While not as efficient in mixing gases as a ceramic sponge, a parallel hole monolith is less expensive to manufacture and results in a smaller pressure drop. A stainless steel parallel hole monolith manufactured by the Johnson-Mathey Company of Malvern, Pa. provides the additional advantage of strength which is desirable when exchanger 10 is subject to rough handling. Still another useful supporting member shown in FIG. 1B is a wire mesh 29 such as is made by the Metex Company of Edison, N.J. The wire mesh which is partially wrapped around each of the heat exchange tubes 20 efficiently picks up heat from such tubes and can be easily replaced. Furthermore, "whiskers" of catalytic material can be grown on the wire mesh which can expand without breaking.

The particular catalytic material used, will of course, depend upon the desired reformation reaction being carried out in the exchanger 10. In one particularly useful reaction where in methanol (methyl alcohol) is reformed into hydrogen and carbon monoxide, the catalyst material consists of a mixture of Cu-Ni-Cr supported on a suitable carrier as described in U.S. Pat. No. 4,110,256 to Takeuchi et al.

The baffle plates 26 occupy a substantial but incomplete cross-section of the reaction zone 18. In the embodiment shown in FIG. 1, the baffle plate 26a permits the gaseous or vaporized mixture to flow around its bottom surface and the baffle 26b permits the gaseous or vaporized mixture to flow around its top surface. The gaseous or vaporized mixture thus flows through the reaction chamber 18 in a vertically tortuous path. Furthermore, the baffle plates 26a and 26b are spaced from one another at increasing or decreasing distances, depending upon whether expansion or contraction is desired, forming regions, 18a, 18b, and 18c, within the reaction zone 18 of varying transverse volume. In exothermic reactions such as methanation or ammonia synthesis, where contraction is desired, a cooling liquid or gas is circulated through the heat exchange tubes 20. In endothermic reactions the decomposition of methanol, where expansion is desired, a heating liquid or gas is circulated through the tubes 20.

In the embodiment illustrated in FIG. 1 wherein expansion is desired, the baffle plate 26a is located approximately 12 inches from the stationary tube sheet 24. The baffle plate 26b is spaced 18 inches from the baffle plate 26a and 24 inches from the closed end of the shell 12. As a result of this baffle plate placement, the regions 18a, 18b, and 18c, have progressively increasing transverse volumes. Expansion is also accommodated by placing the baffle plate 26a closer to the shell wall than the baffle plate 26b so there is more room for the gases or vapors to go around the top of the baffle plate 26b then to go around the bottom of the baffle plate 26a. Also the outlet conduit 16 is bigger than the inlet conduit 14 so again there is room for expansion.

A bonnet head 32 is removably mounted on the open end of the shell 12 by means of a gasket 34 and bolts 36. Removal of the bonnet head 32 and disengagement of the shell 12 provides access to the reaction zone 18 for cleaning/removal of the heat exchange tubes 20 and insertion/removal of the parallel hole monolith, ceramic sponge, or wire mesh catalyst supporting member. This insertion/removal can be accomplished by moving the shell 12 away from the tube sheet 24.

In the catalytic heat exchanger 100 shown in FIG. 2, the catalyst material supporting member 128 is supplied in the form of ceramic pellets. Ceramic pellets have the advantage of being the least expensive form of supporting member to manufacture but have the disadvantage of causing the highest pressure drop. The ceramic pellets are held in place within the reaction zone 118 by a wire mesh 140. Each of the regions 118a, 118b, and 118c of the reaction zone 118 are provided with nozzles 142a, 142b, and 142c, respectively, for insertion and removal of the ceramic pellets.

In the embodiment shown in FIG. 2, the baffle plate 126a permits the gaseous or vaporized mixture to flow around its rear surface and the baffle plate 126b permits the gaseous or vaporized mixture to flow around its front surface. The gaseous or vaporized mixture thus flows through the reaction zone 118 in a horizontally tortuous flow path.

The heat exchangers 10 and 100 shown in FIGS. 1 and 2 are particularly useful in reforming fuel such as methanol and ethanol and the like into a reformed gas mixture rich in hydrogen and carbon monoxide by the catalytic decomposition of the alcohols. In operation of the exchangers 10 and 100 for the production of fuel grade gas, a heating fluid such as the exhaust gas of an internal combustion engine is flowed through the heat exchange tubes 20, 120 via an inlet conduit 38, 138 and an outlet conduit 39, 139 located in the bonnet head 32, 132 to heat the catalyst material 30, 130. When the catalyst material is heated to a temperature sufficient to reform the alcohol, alcohol vapors from a source (not shown) are introduced into the reaction zone 18, 118 via the inlet conduit 14, 114 and are withdrawn from the reaction zone via the outlet conduit 16, 116. As the alcohol vapors flow through the reaction zone 18, 118, through the inlet conduit 14, 114 they sequentially contact the heat exchange tubes 20, 120 and the catalyst material 30, 130 located in the region 18a, 118a and then recontact the heat exchange tubes 20, 120 before flowing around the baffle plate 26a, 126a, into the region 18b, 118b where the contact process is repeated in regions 18b, 118b and 18c, 118c. The intermittent alcohol vapor contact with the heat exchange tubes and the catalyst material provides a uniform temperature which in turn provides reaction specificity. The U-shaped heat exchange tubes 20, 120 can expand or contract without abrading the catalytic material supporting member and such supporting member can be easily removed from the reaction zone 18, 118, by disengaging the shell 12 or removing pellets out of nozzles 142a, 142b and 142c.

The invention has been described in detail with particular reference to preferred embodiments thereof, but it will be obvious to those skilled in the art that various changes and modifications may be made therein without detracting from the invention and the invention is, therefore, intended to cover all such changes and modification as fall within the true spirit and scope of the appended claims.

I claim:

1. A catalytic heat exchanger useful for carrying out a catalytic reaction wherein a gaseous or vaporized mixture is flowed into contact with catalytic material reactive with such mixture, said catalytic heat exchanger comprising:
   (a) a hollow container defining a reaction zone for the gaseous or vaporized mixture and the catalytic material;
   (b) an inlet conduit and an outlet conduit for the gaseous or vaporized mixture respectively located at opposite ends of said reaction zone;
   (c) baffle means disposed within said reaction zone transversed to the flow of the gaseous or vaporized mixture, said baffle means occupying a substantial but incomplete cross-section of said reaction zone available for the flow of the gaseous or vaporized mixture so as to form a tortuous flow path for the gaseous or vaporized mixture and to divide said reaction zone into at least first and second regions having first and second transverse volumes, respectively, which vary as a function of the distance from said inlet conduit;
   (d) means for supporting catalytic material within said first and second regions of said reaction zone; and
   (e) heat exchange means disposed within said first and second regions of said reaction zone and adapted to circulate a heat exchange fluid therethrough in a manner such that a gaseous or vaporized mixture flowing through said reaction zone sequentially (1) flows across said heat exchange means, (2) flows through the catalytic material located in said first region, (3) flows around said baffle means, (4) flows across said heat exchange means, and (5) flows through the catalytic material located in said second region.

2. A catalytic heat exchanger in accordance with claim 1 wherein the transverse volume of said second region of said reaction zone is larger than the transverse volume of said first region.

3. A catalytic heat exchanger in accordance with claim 1 wherein the transverse volume of said second region of said reaction zone is smaller than the transverse volume of said first region.

4. A catalytic heat exchanger in accordance with claim 1 wherein said reaction zone is substantially cylindrical in shape.

5. A catalytic heat exchanger in accordance with claim 4 wherein said catalytic material supporting means is disposed longitudinally of said reaction zone.

6. A catalytic heat exchanger in accordance with claim 1 wherein said catalytic material supporting means comprises a wire mesh.

7. A catalytic heat exchanger in accordance with claim 6 wherein said wire mesh is partially wrapped around said heat exchange means.

8. A catalytic heat exchanger in accordance with claim 1 wherein said catalytic material supporting means comprises a parallel hole monolith.

9. A catalytic heat exchanger in accordance with claim 1 wherein said catalytic material supporting means comprises a ceramic sponge.

10. A catalytic heat exchanger in accordance with claim 1 wherein said catalytic material supporting means comprises ceramic pellets.

11. A catalytic heat exchanger in accordance with claim 10 wherein said container has at least one nozzle for the introduction and removal of the ceramic pellets.

12. A catalytic heat exchanger in accordance with claim 10 further comprising retaining means for retaining said ceramic pellets within said reaction zone.

13. A catalytic heat exchanger in accordance with claim 1 wherein said heat exchange means comprises a removable bundle of U-shaped tubes.

* * * * *